(12) United States Patent
Wu et al.

(10) Patent No.: US 6,911,648 B2
(45) Date of Patent: Jun. 28, 2005

(54) SENSOR ASSEMBLY

(75) Inventors: Steve S. Wu, Everett, WA (US);
Martin L. Dickrell, Seattle, WA (US);
George F. Nicholas, Everett, WA (US);
Timothy A. Christensen, Camano Island, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/298,869

(22) Filed: Nov. 18, 2002

(65) Prior Publication Data

US 2003/0071205 A1 Apr. 17, 2003

Related U.S. Application Data

(62) Division of application No. 09/667,395, filed on Sep. 20, 2000, now Pat. No. 6,518,565.

(51) Int. Cl.$^7$ .................................................. H01J 40/14
(52) U.S. Cl. ........................ 250/239; 250/221; 250/216
(58) Field of Search ............................... 250/239, 221, 250/216, 222.1, 559.21, 559.22, 559.23; 356/4.01, 601; 340/555, 556, 557

(56) References Cited

U.S. PATENT DOCUMENTS

| | | | |
|---|---|---|---|
| 4,412,129 A | * 10/1983 | Duncan | ....................... 250/239 |
| 4,758,093 A | * 7/1988 | Stern et al. | .................. 356/608 |
| 4,782,224 A | * 11/1988 | Haas et al. | .................. 250/221 |
| 4,808,830 A | 2/1989 | Burgis | |
| 4,827,436 A | 5/1989 | Sabersky et al. | |
| 5,365,062 A | 11/1994 | Saffari et al. | |
| 5,446,281 A | * 8/1995 | Taranowski et al. | ........ 250/221 |
| 6,022,124 A | 2/2000 | Bourn et al. | |
| 6,348,686 B1 | 2/2002 | Howard et al. | |

FOREIGN PATENT DOCUMENTS

JP          03-173268 A    *   7/1991    .......... H04N/1/028

OTHER PUBLICATIONS

Brochure, QMT42 Series Fixed–field Sensors, p. 2, by Banner Engineering Corporation, published prior to Jun, 27, 2000.
Brochure, Cuttler–Hammer & Opcon Photoelectric Sensors–6200 and 6210 retroreflectors, insulation instructions–document 102857 (1 page), published prior to Jun. 27, 2000.
Article entitled "Plastic Optics Challenge Glass", by David J. Butler, Published in Photonics Spectra, pp. 168–172, published prior to Jul. 6, 2000.

* cited by examiner

Primary Examiner—Kevin Pyo
(74) Attorney, Agent, or Firm—Tarolli, Sundheim, Covell & Tummino L.L.P.

(57) ABSTRACT

A sensor assembly includes a housing and a plurality of lenses. The lenses are connected with a lens carrier by a plurality of releasable connector elements. A circuit board is disposed on the lens carrier. The circuit board has a black coating. A connector assembly connects the circuit board with an electrical conductor. The connector assembly includes a body portion and a flange portion. The flange portion engages a recess in the sensor housing to hold the body portion of the connector assembly against axial movement relative to the sensor housing. A retainer extends from a cover portion of the sensor housing into engagement with the flange portion of a connector assembly to hold the flange portion against rotation to thereby block unauthorized access to the interior of the sensor housing. A light detector is movable relative to a light source to enable the distance from the light source to a location from which reflected light is received by the detector to be adjusted.

3 Claims, 8 Drawing Sheets

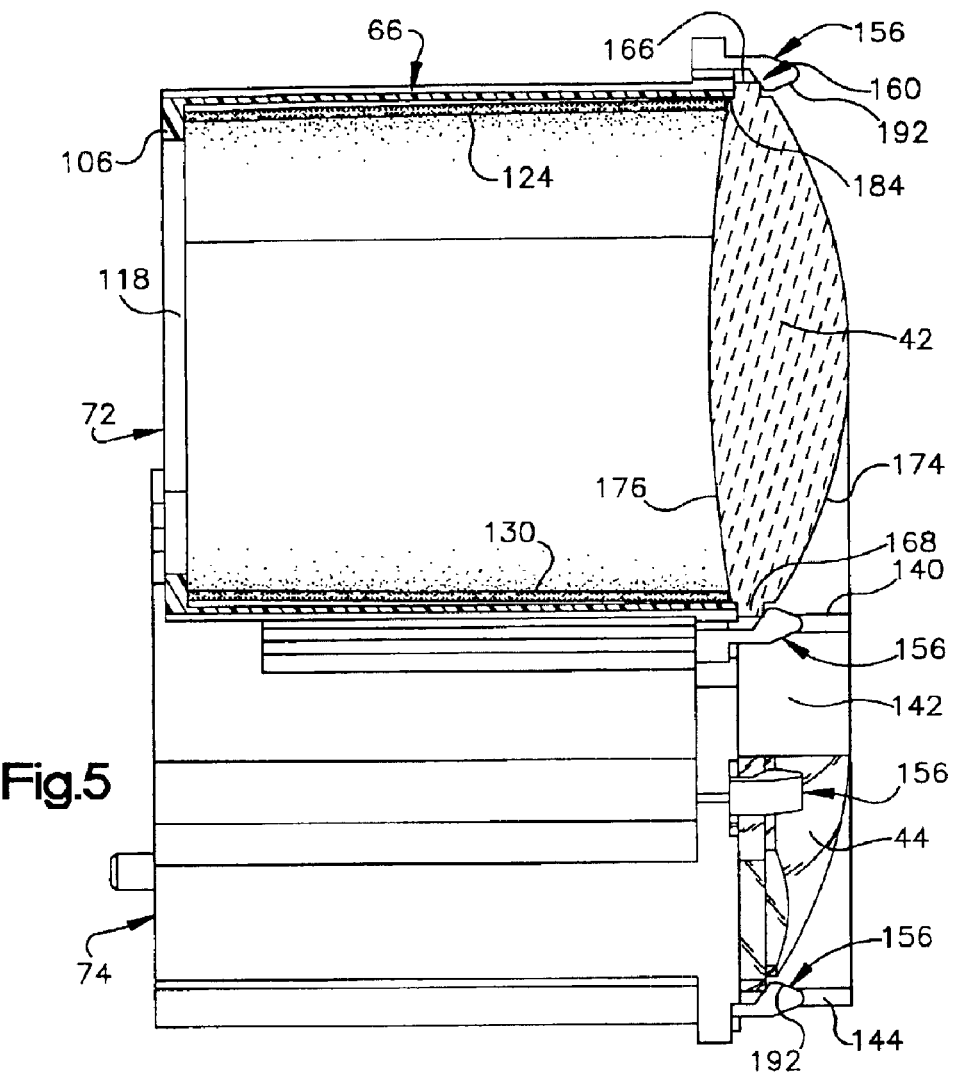
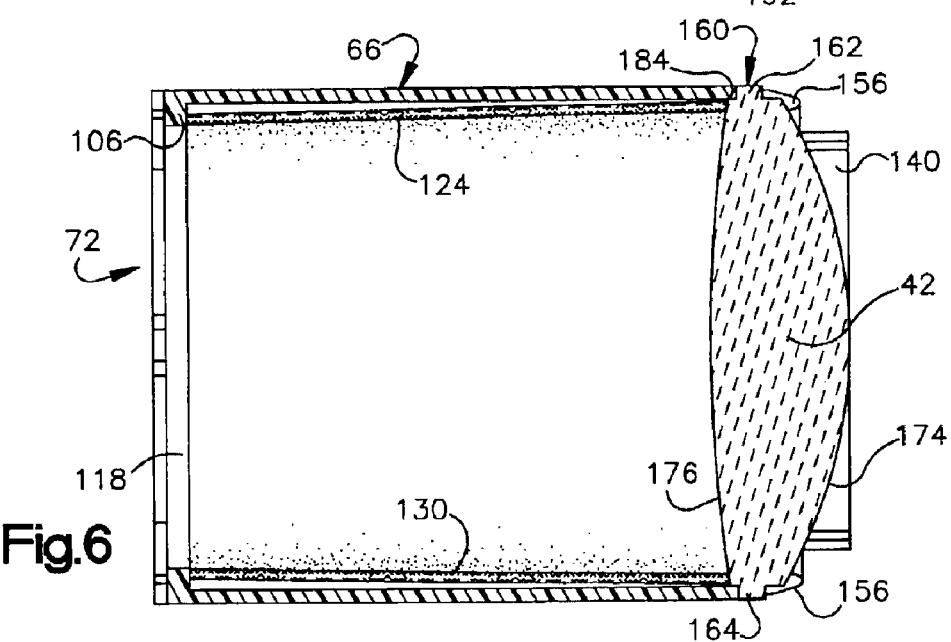

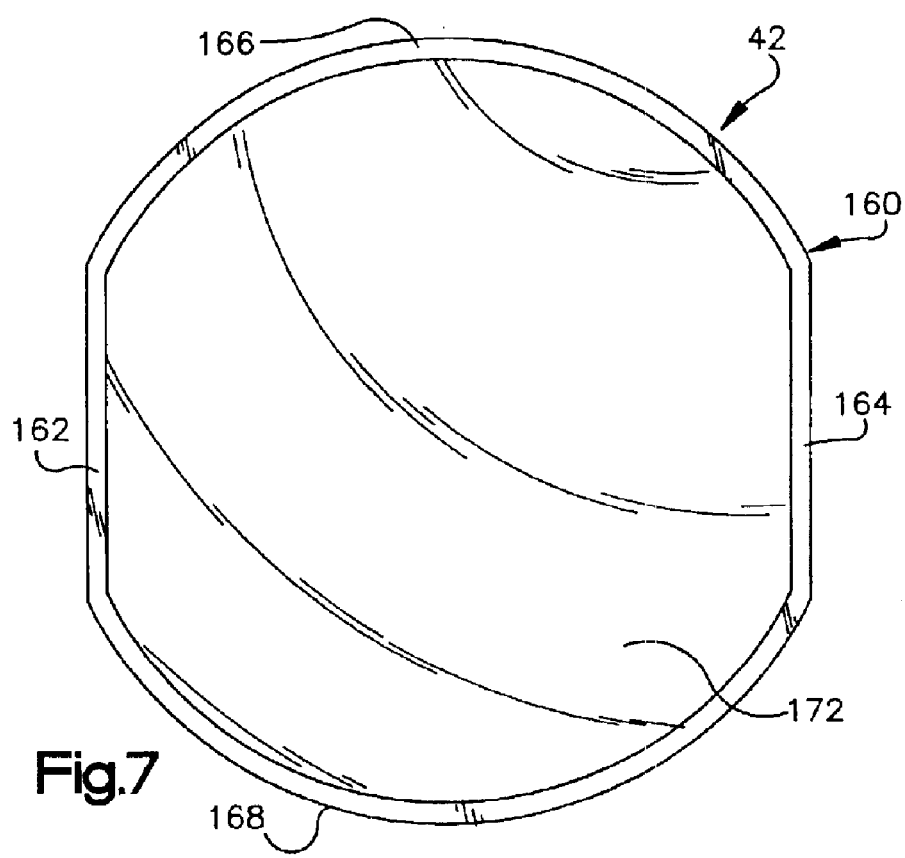
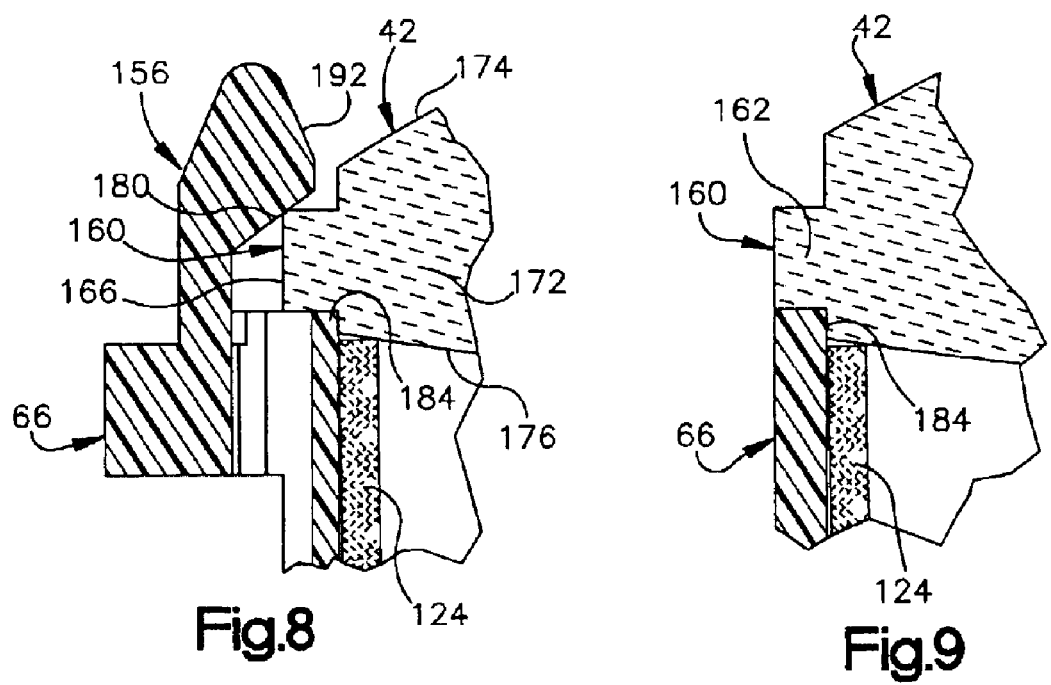

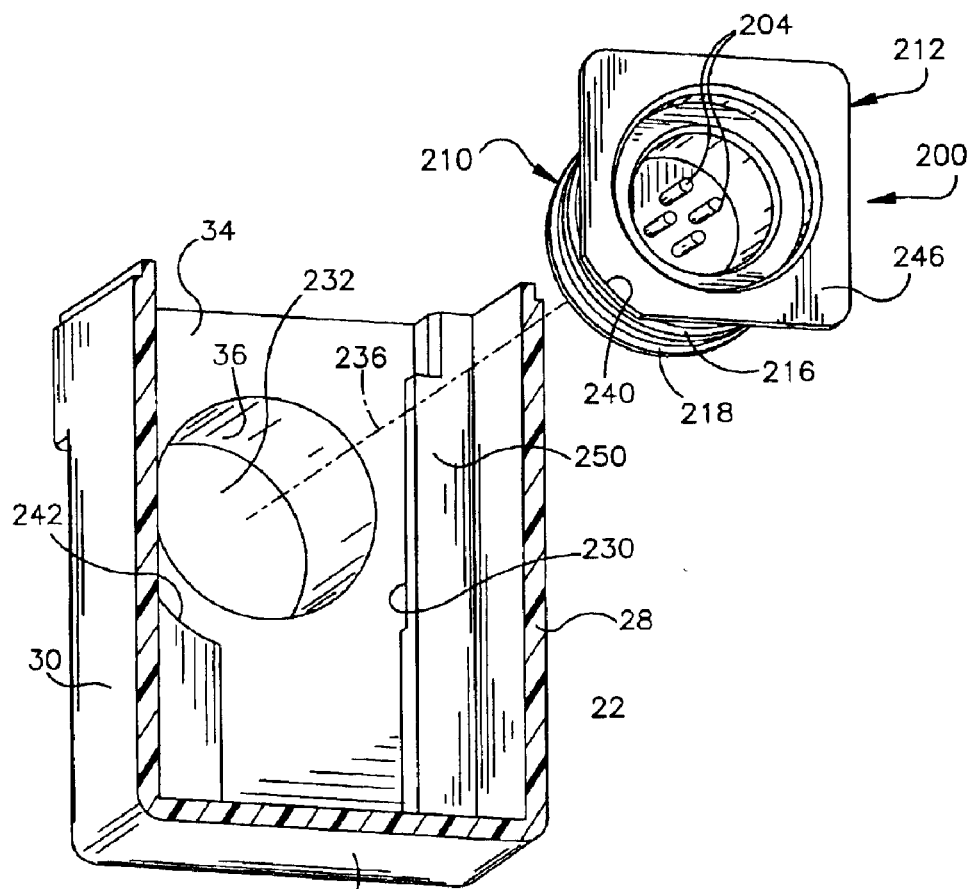
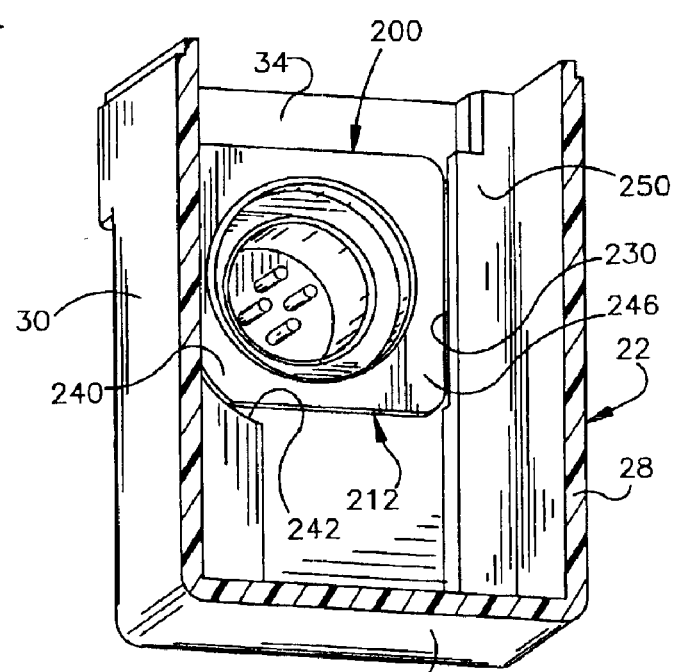

SENSOR ASSEMBLY

RELATED APPLICATION

This application is a divisional of application Ser. No. 09/667,395 filed Sep. 20, 2000 now U.S. Pat. No. 6,518,565. The disclosure in the aforementioned application Ser. No. 09/667,395 is hereby incorporated herein in its entirety by this reference thereto.

BACKGROUND OF THE INVENTION

The present invention relates to a sensor assembly which may be utilized to detect objects at a location spaced from the sensor assembly.

A known sensor assembly has a light source or emitter from which light is transmitted to an object spaced from the sensor assembly. The light is reflected from the object back through a second lens to a detector.

Users of known sensor assemblies have tried to gain access to the interior of the sensor assemblies by engaging wrenching flats on electrical connectors for the sensor assemblies. This can result in unauthorized tampering with the sensor assemblies in a manner which is detrimental to the operation of the sensor assemblies.

The lenses in a sensor assembly should be easy to accurately position in the sensor assembly. In addition, the lenses in a sensor assembly should not become loose during use of the sensor assembly. It is also important to have the light source and light detector accurately positioned relative to each other and to the lenses.

From a commercial standpoint, it is necessary to minimize the cost of a sensor assembly. It is also desirable to make the sensor assembly compact so that it can be easily positioned in many different environments. There should be minimal reflection of light from components of a sensor assembly. The lenses in a sensor assembly should be protected from the environment in which the sensor assembly is utilized so that the operating qualities of the sensor assembly do not deteriorate with the passage of time.

SUMMARY OF THE INVENTION

The present invention relates to a new and improved sensor assembly. The sensor assembly includes a light source and a lens which directs light from the light source to a remote object. Light reflected from the remote object is transmitted through another lens to a light detector.

The lenses may advantageously be mounted on a lens carrier. The lens carrier is disposed in a housing. The lenses are advantageously connected with the lens carrier by a plurality of releasable connectors. The connectors may be disposed in engagement with the rim portions of the lenses and press the lenses into recesses formed in the lens carrier. The connectors may be of the snap-in type.

The sensor assembly may advantageously include a connector assembly which connects the sensor assembly with an electrical conductor. This tamper resistant electrical connector assembly may include a body portion and a flange portion. The flange portion may be movable to engage a recess in the sensor housing and retain the electrical connector assembly against movement along a central axis of body portion of the connector assembly. In order to resist unauthorized access to the interior of the sensor assembly, a retainer may engage the flange portion of the electrical connector assembly and hold the flange portion against movement out of engagement with the recess.

The light source and/or the light detector may be movable relative to a circuit board to adjust the distance at which light from the light source is reflected from an object back to the detector. The circuit board may be connected with the lens carrier. A black coating may advantageously be provided on a side of the circuit board facing toward the lenses.

The sensor assembly may include one or more of a plurality of features of the present invention. It should be understood that although the features may advantageously be used in combination with each other, the features may also be used separately.

BRIEF DESCRIPTION OF THE DRAWINGS

The foregoing and other features of the invention will become more apparent upon a consideration of the following description taken in connection with the accompanying drawings wherein:

FIG. 3 is an enlarged side elevational view of a lens carrier which holds lenses in the sensor assembly of FIG. 1;

FIG. 5 is a sectional view, taken generally along the line 5—5 of FIG. 3 and illustrating the manner in which a lenses are releasably connected with the lens carrier;

FIG. 6 is a sectional view, taken generally along the line 6—6 of FIG. 3, further illustrating the relationship of a lens to the lens carrier;

FIG. 7 is an enlarged plan view of one of the lenses in the sensor assembly of FIG. 1;

FIG. 8 is an enlarged fragmentary sectional view depicting the manner in which a releasable connector engages a rim of the lens of FIG. 7 to hold the lens against movement relative to the lens carrier of FIGS. 3 and 5;

FIG. 9 is an enlarged fragmentary sectional view, further illustrating the relationship of the rim of the lens of FIG. 7 to the lens carrier of FIGS. 3 and 6;

FIG. 10 is an exploded schematic pictorial illustration depicting the manner in which an electrical connector assembly is positioned relative to an opening in a bottom wall of the housing of the sensor assembly of FIG. 1;

FIG. 11 is a schematic illustration depicting the electrical connector assembly in a release position relative to the bottom wall of the sensor housing;

DESCRIPTION OF SPECIFIC PREFERRED EMBODIMENTS OF THE INVENTION

General Description

Figure 1:
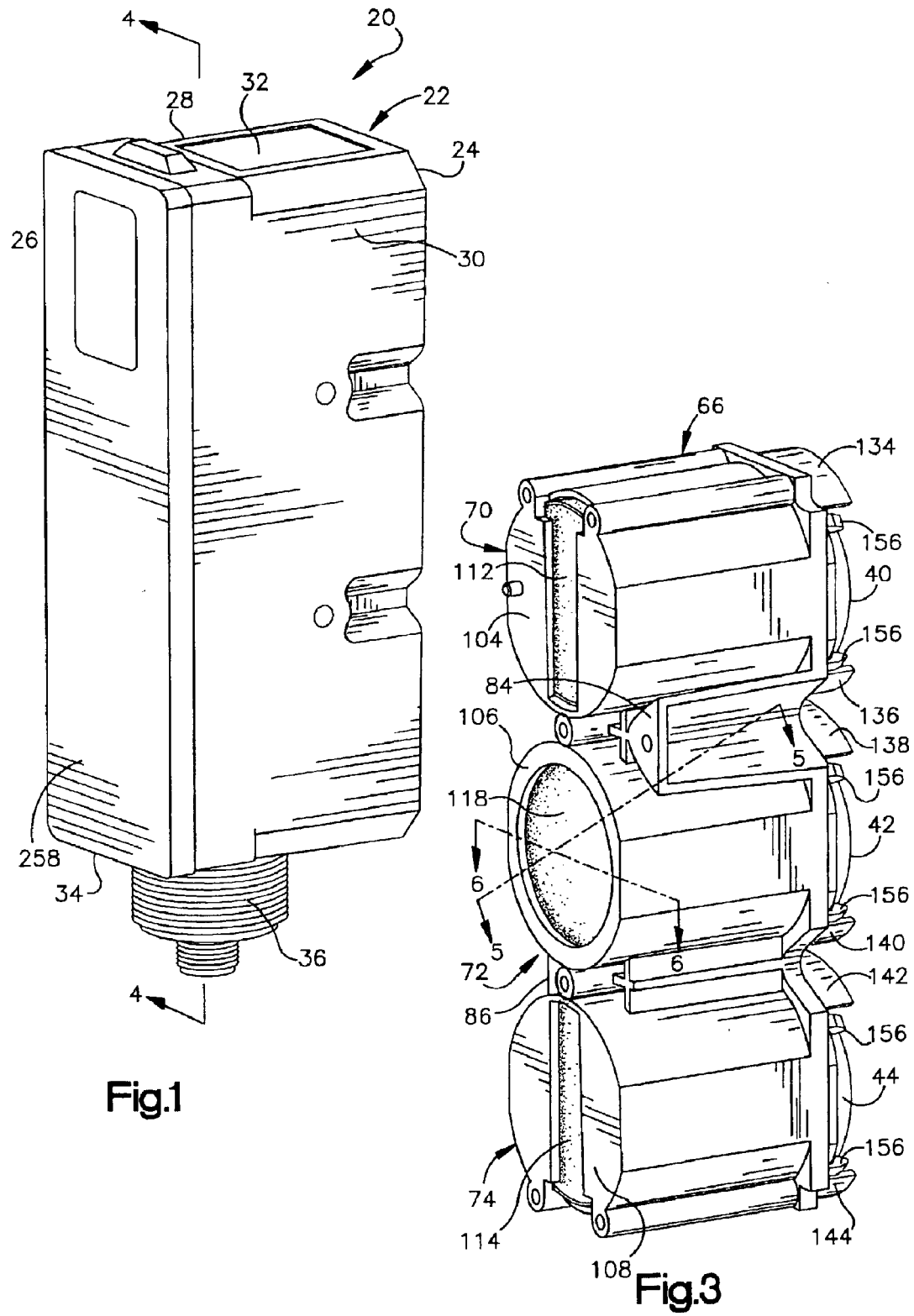
FIG. 1 is an elevational view of a sensor assembly constructed in accordance with the present invention.
Figure 2:
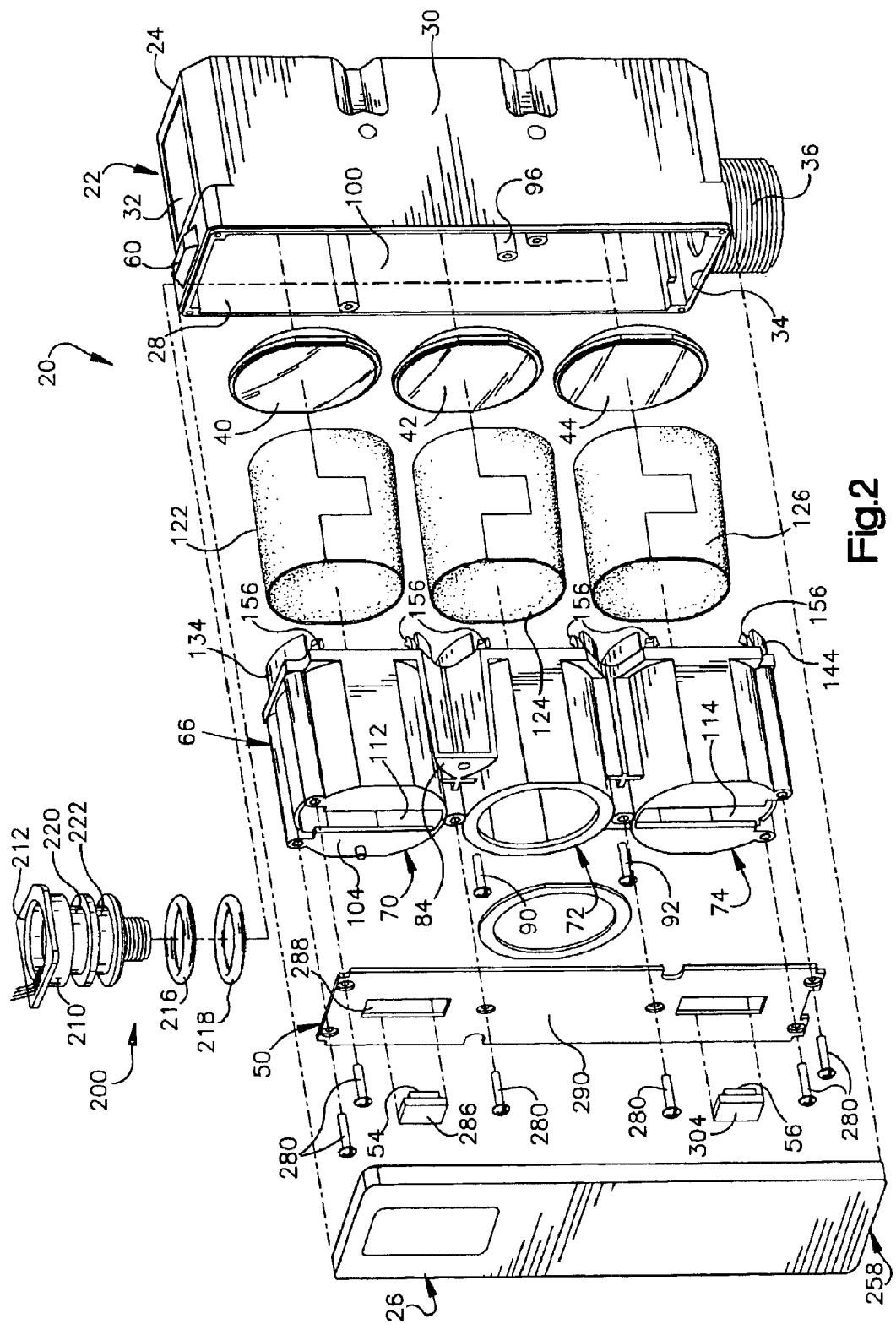
FIG. 2 is an exploded view illustrating components of the sensor assembly of FIG. 1.

A sensor assembly 20, constructed in accordance with the present invention, is illustrated in FIGS. 1 and 2. The sensor assembly 20 includes a housing 22. The housing 22 includes a flat, generally rectangular, front wall 24 and a flat, generally rectangular, rear wall 26 which extends parallel to the front wall 24. A pair of rectangular parallel side walls 28 and 30 extend between the front wall 24 and rear wall 26. Parallel rectangular upper and lower end walls 32 and 34 extend between the side walls 28 and 30.

A cylindrical, externally threaded, mounting section 36 extends from the lower end wall 34. It is contemplated that the mounting section 36 will be inserted through a circular opening in a base or support member. The mounting section 36 may be connected with the base or support member by an internally threaded member or nut.

In the illustrated embodiment of the invention, the housing 22 has a generally rectangular configuration. However, it is contemplated that the housing 22 could have a different configuration if desired. For example, the housing could have a cylindrical configuration.

The front wall 24, side walls 28 and 30, end walls 32 and 34, and the mounting section 36 are integrally formed as one piece. In the illustrated embodiment of the invention, the housing 22 is molded of a polymeric material. The front wall 24, side walls 28 and 30, end walls 32 and 34, and mounting section 36 are integrally molded as one piece. The rear wall 26 is molded separately from the remainder of the housing 22 and forms a cover for the housing.

Figure 4:
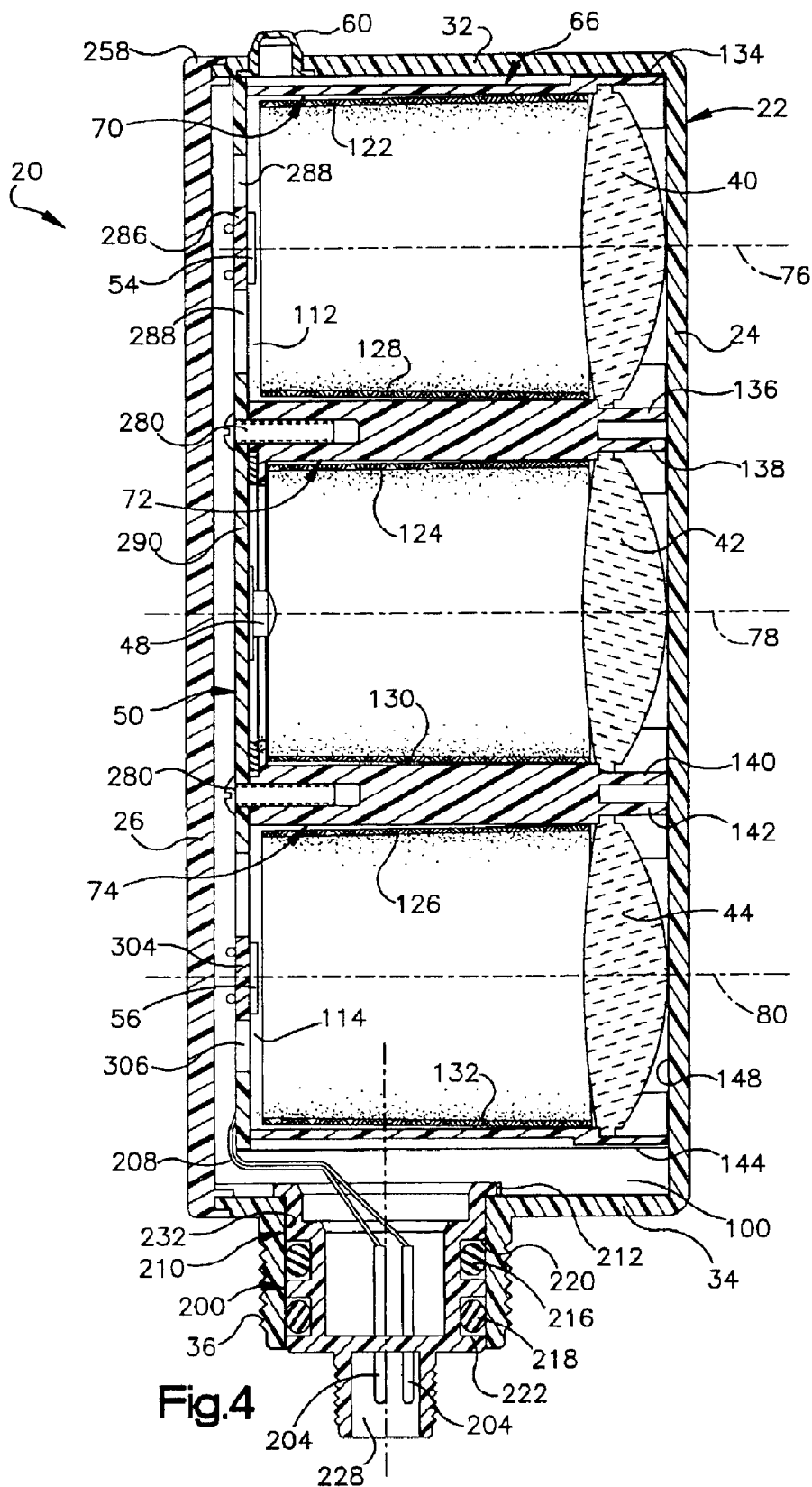
FIG. 4 is a sectional view, taken generally along the line 4—4 of FIG. 1, further illustrating the construction of the sensor assembly.

In the illustrated embodiment of the sensor assembly 20, the sensor assembly includes three lenses 40, 42 and 44 (FIGS. 2 and 4). The center lens 42 is associated with a light source or emitter 48 (FIG. 4) mounted on a rectangular circuit board 50 (FIGS. 2 and 4) disposed within the sensor housing 22. Upper and lower light detectors 54 and 56 (FIG. 4) are disposed in the housing 22 in association with upper and lower lenses 40 and 44.

The illustrated embodiment of the sensor assembly 20 includes a pair of light detectors 54 and 56 associated with a pair of lenses 40 and 44. However, a greater or lesser number of light detectors could be provided in association with a greater or lesser number of lenses. In addition, a plurality of light sources and associated lenses could be provided. For example, a single light source 48 and lens 42 could be provided in association with a single light detector 54 and lens 40. Alternatively, a plurality of light sources and associated lenses could be provided in association with a plurality of light detectors and lenses.

The light source 48 is electrically energized to provide radiation which can be sensed by the light detectors 54 and 56. By providing a pair of light detectors 54 and 56, the sensor assembly 20 can be utilized to sense the distance of an object from the sensor assembly, that is, the sensor assembly 20 has depth perception. Of course, when depth perception or distance sensing is not required, the number of light detectors could be reduced.

It is contemplated that the light source 48 could provide many different types of radiation. Thus, the light source 48 could provide electromagnetic radiation anywhere within a wavelength range which includes the infrared range, visible, ultraviolet, and X-rays. Of course, the light source 48 could be utilized to provide a different type of radiation if desired.

In the illustrated embodiment of the invention, the light source 48 provides infrared radiation. Therefore, the detectors 54 and 56 are effective to detect the presence of infrared radiation. Of course, if the light source 48 provided a different type of radiation, the detectors 54 and 56 would be constructed to sense this radiation.

The housing 22 is advantageously formed of a material through which light having an infrared wavelength can be transmitted. Light in the visible spectrum is blocked by the material of the housing. In one specific embodiment of the invention, the housing 22 was molded of General Electric Lexan (trademark) polymeric material to which a die of color 21092 was added. The resulting housing is transparent to light in the infrared spectrum while being opaque to light in the visible spectrum.

Of course, if the light source 40 provided radiation other than infrared light, the housing 22 would be transparent to whatever radiation was provided by the light source 48. For example, the light source 48 could be a source of light in the visible spectrum and at least the front wall 24 of the housing 22 would be transparent to light in the visible spectrum. Of course, if this was done, the detectors 54 and 56 would be effective to detect light in the visible spectrum.

In the illustrated embodiment of the invention, the lenses 40, 42 and 44, light source 48 and light detectors 54 and 56 are all enclosed within the housing 22. This protects the lenses 40, 42 and 44, light source 48, and light detectors 54 and 56 from contaminants in an environment in which the sensor assembly 20 is utilized. In the illustrated embodiment of the invention, the housing 22 is sealed so that contaminants from the environment around the housing can not enter the housing. However, if desired, at least the front wall 24 could be formed with openings to at least partially expose the lenses 40, 42 and 44.

When the sensor assembly 20 is to be utilized to detect the presence of objects at a location spaced from the sensor assembly, the light source 48 is electrically energized to provide radiation, specifically, infrared radiation. The infrared radiation is transmitted from the light source 48 through the center lens 42 and front wall 24 to the object to be sensed. Infrared light from the light source 48 is reflected from the object to be sensed through the front wall 24 to the upper and lower lenses 40 and 44. The upper and lower lenses 40 and 44 direct the reflected infrared light to upper and lower light detectors 54 and 56.

The upper and lower light detectors 54 and 56 provide output signals in response to the reflected infrared light. These output signals indicate the presence of the object at the location which is spaced from the sensor assembly 20.

In the illustrated embodiment of the sensor assembly 20, light emitting diodes are mounted on the circuit board 50 adjacent to a window 60 which is molded into the upper end wall 32 of the housing 22. The window 60 is transparent to light in the visible spectrum. Therefore, light can be transmitted from the LEDs through the window 60 to an operator to provide a visible indication of the detection of an object.

It should be understood, that with the exception of the window 60, the housing 22 has a black appearance to a person viewing the housing. This is because the housing 22 is formed of a material which is opaque to light in the visible spectrum while being transparent to infrared light.

Lens Carrier

In accordance with one of the features of the present invention, the lenses 40, 42 and 44 are disposed on a lens carrier 66 (FIGS. 2, 3, 4, 5 and 6). In addition, the circuit board 50, light source 48, and light detectors 54 and 56 are disposed on the lens carrier 66. The lens carrier 66 facilitates accurate positioning of the lenses 40–44, light source 48 and light detectors 54 and 56 relative to each other before they are inserted into the housing 22.

The lens carrier 66 has a generally rectangular configuration (FIGS. 2 and 3) and supports the lenses 40, 42 and 44 in the housing 22 (FIG. 4). The lens carrier 56 includes a plurality of tubular sections 70, 72 and 74. The tubular sections 70, 72 and 74 have parallel central axes 76, 78, and 80 (FIG. 4) which extend through the centers of the lenses 40, 42 and 44. The central axes 76 and 80 of the tubular sections 70 and 74 extend through the centers of the light detectors 54 and 56. Similarly, the central axis 78 of the tubular section 72 extends through the center of the light source 48.

The lens carrier 66 has a mounting section 84 (FIG. 3) disposed between the tubular sections 70 and 72 and offset to the right of the central axes 76 and 78 (FIG. 4) of the tubular sections 70 and 72. A second mounting section 86 (FIG. 3), having the same construction as the mounting section 84, is disposed between the tubular sections 72 and 74. The mounting section 86 is offset to the left (as viewed in FIG. 3) of the central axes 78 and 80 (FIG. 4) of the tubular sections 72 and 74.

The lens carrier 66 is connected to the housing 22 by fasteners 90 and 92 (FIG. 2) which extend through openings in the mounting sections 84 and 86 into openings in ribs formed on the side walls 28 and 30 (FIG. 2) of the housing 22. Although only a single rib 96 on the side wall 28 for receiving the fastener 92 is illustrated in FIG. 2, it should be understood that a similar rib is formed on the side wall 30 of the housing 22 and has an opening to receive the fastener 90. The fasteners 90 and 92 cooperate with the mounting sections 84 and 86 and the ribs 96 to accurately position and securely retain the lens carrier 66 in the housing 22.

The mounting sections 84 and 86 (FIG. 3) cooperate with the ribs 96 in the housing 22 to enable the lens carrier 66 to be inserted into a rectangular chamber 100 (FIG. 2) in the housing 22 only when the lenses 40, 42 and 44 are leading so that the lenses are disposed adjacent to the front wall 24 in the manner illustrated in FIG. 4. The tubular sections 70, 72 and 74 have rear end walls 104, 106 and 108 (FIG. 3) which enable light to be transmitted between the lenses 40, 42 and 44 and the light source 48 and light detectors 54 and 56 mounted on the circuit board 50 (FIG. 4). Thus, the end walls 70 and 74 have central slots 112 and 114 (FIG. 3) which are aligned with the upper and lower light detectors 54 and 56 (FIG. 4). Similarly, the end wall 106 has a central opening 118 (FIG. 3) which is aligned with the light source 48. It should be understood that the openings 112, 114 and 118 could have a different configuration if desired.

In the illustrated embodiment of the invention, the lens carrier 66 is integrally formed as one piece. The lens carrier 66 may be integrally molded of a polymeric material which blocks the transmission of infrared radiation. This results in infrared light and in visible light being blocked by the lens carrier. However, if desired, the lens carrier 66 could be formed of a different material.

Generally cylindrical tubes 122, 124 and 126 (FIG. 2) of flock paper line cylindrical chambers in the tubular sections 70, 72 and 74 (FIG. 4). The tubes 122, 124 and 126 have black inner surfaces 128, 130 and 132 with a velvety texture. This enables the tubes 122, 124 and 126 (FIG. 4) to absorb stray rays of light. It is contemplated that the tubes 122, 124 and 126 could be formed of material other than flock paper if desired. In fact, the tubes 122, 124 and 126 could be omitted if desired and the sides of the interior surfaces of the tubular sections 70, 72 and 74 of the lens carrier 66 could be coated with a black material which has a rough or velvety surface and which absorbs light.

The tubes 122, 124 and 126 extend between the lenses 40, 42 and 44 and the end walls 104, 106 and 108 of the tubular sections 70, 72 and 74 (FIGS. 3, 4, 5, and 6). Thus, the end of the tube 124 (FIG. 5) closest to the front wall 24 (FIG. 4) of the housing 22 is disposed in abutting engagement with the lens 42 (FIGS. 5 and 6). The opposite end of the tube 124 is disposed in abutting engagement with the end wall 106 of the tubular section 72. Although only the relationship between the flock paper tube 124 and the tubular section 72 of the lens carrier 66 is illustrated in FIGS. 5 and 6, it should be understood that the tubes 122 and 126 in the tubular sections 70 and 74 (FIG. 4) are also disposed in engaged with their associated lenses 40 and 44 and housing end walls 104 and 108 (FIG. 3).

The lens carrier 66 has a plurality of arcuate shields 134, 136, 138, 140, 142 and 144 (FIGS. 3 and 4) which block the transmission of light between the tubular sections 70, 72 and 74 of the lens carrier. The shields 134–144 are disposed in abutting engagement with an inner side surface 148 (FIG. 4) of the front wall 24. Therefore, the shields 134–144 are effective to block the direct transmission of light between the tubular sections 70, 72 and 74 of the lens carrier 66.

The lens carrier 66 supports the lenses 40, 42 and 44. The lenses 40, 42 and 44 are positioned in abutting engagement with the inner side surface 148 of the front wall 24 by the lens carrier 66. However, if desired, the lens carrier 66 could be constructed so as to position the lenses 40, 42 and 44 in a spaced apart relationship with the front wall 24 of the housing 22.

The front wall 24 of the housing 22 extends across and protects the lenses 40, 42 and 44. The smooth, flat front wall 24 of the housing 20 is relatively easy to clean. The lenses 40, 42 and 44 are protected from dust, dirt and other contaminants in the environment in which the sensor assembly 20 is used.

It is preferred to utilize the lens carrier 66 to position the lenses 40, 42 and 44 relative to each other while the lens carrier 66 is outside of the housing 22. The lens carrier 66 and lenses 40, 42 and 44 can then be inserted into the housing 22 as a unit with the lenses accurately positioned relative to each other. However, if desired, the lens carrier 66 could be omitted. If this was done, the housing 22 would be constructed so as to have supporting surfaces for engaging the lenses 40, 42 and 44. It is preferred to completely enclose the lenses 40, 42 and 44 in the sealed housing 22. However, if desired, openings could be provided in the front wall 24 to expose the lenses 40, 42 and 44.

Lens Connectors

In accordance with another one of the features of the present invention, lens connectors 156 are provided to releasably connect the lenses 40, 42 and 44 with the lens carrier 66. The lens connectors 156 enable the lenses 40, 42 and 44 to be quickly and accurately positioned relative to the lens carrier 66. The lens connectors 156 also enable a lens 40, 42 or 44 to be easily connected with and subsequently disconnected from the lens carrier 66.

The specific lens connectors 156 disclosed herein for connecting the lenses 40, 42 and 44 with the lens carrier 66, are resiliently deflectable snap-in type connectors. However, it is contemplated that the lens connectors 156 could have a different construction if desired. For example, the lens connectors 156 could have thread convolutions which engage thread convolutions on the lens carrier 66 to retain the lenses 40, 42 and 44 in place. Alternatively, the lens connectors 156 could be formed by a plurality of fasteners which are connected with the lens carrier 66 by a threaded connections or by snap-in connections.

The specific lens connectors 156 disclosed herein are resilient fingers which are integrally formed as one piece with the lens carrier 66. The resilient lens connectors 156 are deflectable by the lenses 40, 42 and 44 to enable the lenses to snap into place on the lens carrier. However, the lens connectors 156 could be integrally formed as one piece with the lenses 40, 42 and 44 if desired.

In order to provide the sensor assembly 20 with a relatively compact construction, the lenses 40, 42 and 44 are all formed with a noncircular configuration. Thus, the lens 42 (FIG. 7) has a rim portion 160 which extends around the lens 42. The rim portion 160 includes a plurality of linear side sections 162 and 164. The side sections 162 and 164 extend parallel to each other. Although a pair of parallel side sections 162 and 164 are provided on the rim portion 160, it is contemplated that the rim portion could be provided with a greater or lesser number of linear side sections. If a greater number of linear side sections are provided, the side sections could be skewed relative to each other.

The rim portion 160 of the lens 42 also includes a plurality of arcuate sections 166 and 168. The arcuate sections 166 and 168 have centers of curvature which are coincident with the center of the lens 42. Although the lens 42 has an oval configuration, it should be understood that the lens 42 could have a rectangular configuration if desired. For example, the arcuate sections 166 and 168 could at least be partially replaced by linear sections. This would have the effect of reducing the vertical extent (as viewed in FIGS. 1 and 4) of the sensor assembly 20.

The rim portion 160 forms a rib or flange which extends outward from a main portion 172 of the lens 42. The main portion 172 of the lens 42 has convex inner and outer side surfaces 174 and 176 (FIGS. 5, 6 and 8). The outer side surface 174 of the lens 42 has a smaller radius of curvature than the inner side surface 176. The inner side surface 176 is almost flat and, if desired, may be flat.

The rim portion 160 is releasably engaged by the lens connectors 156 to hold the lens 42 against movement relative to the lens carrier 66. Thus, the lens connector 156 of FIG. 8 has a retainer surface 180 which presses the arcuate section 166 of the rim portion 160 of the lens 42 firmly against an end of the lens carrier 66. The lens connector 156 continuously applies force to press the lens 42 against the lens carrier 66. In the illustrated embodiment of the invention, there are four lens connectors 156 for each lens 40, 42 and 44. However, a larger or smaller number of lens connectors 156 could be provided for each lens 40, 42 and 44 if desired.

The lens carrier 66 is formed with a recess 184 having a configuration and size which is the same as the configuration and size of the main portion 172 of the lens 42. The main portion 172 of the lens 42 is telescopically received in the recess 184 in the lens carrier 66. This enables the lens connectors 156 to hold the main portion 172 of the lens 42 in the recess 184. The recess 184 has linear side surface portions and arcuate side surface portions. This enables the linear side sections 162 and 164 of the rim portion 160 to cooperate with corresponding side surfaces of the recess 184 in the lens carrier 66 to hold the lens 42 against rotational movement relative to the lens carrier 66. Although only the lens carrier recess 184 for the lens 42 is illustrated in FIGS. 8 and 9, it should be understood that the lens carrier 66 has a separate recess for each of the lenses 40, 42 and 44.

In the illustrated embodiment of the invention, the lens connectors 156 engage the arcuate sections 166 and 168 of the rim portion 160 of the lens 42 to hold the lens 42 in the recess 184 (see FIG. 5) in the lens carrier 66. The linear side sections 162 and 164 (FIGS. 6 and 7) of the lens 42 cooperate with the recess 184 to hold the lens against rotation relative to the recess. However, additional lens connectors 156 could be provided to engage the linear side sections 162 and 164 of the lens 42 if desired.

In the illustrated embodiment of the invention, the lens connectors 156 are integrally formed as one piece with the lens carrier 66 and are resiliently deflected by the rim portion 160 of the lens 42 when the lens is snapped into the recess 184. Thus, the arcuate section 166 of the rim portion 160 of the lens 42 engages a cam surface 192 (FIG. 8) on the lens connector to resiliently deflect the lens connector toward the left (as viewed in FIG. 8). As this occurs, the lens 42 moves downward into the recess 184. As the lens 42 moves downward (as viewed in FIG. 8) into the recess 184, the resiliently deflected lens connector 156 snaps back to the position shown in FIG. 8. As this occurs, the retainer surface 180 on the connector 156 engages the arcuate section 166 of the rim portion 160 to press the lens 42 firmly against the lens carrier 66 and to hold the lens 42 in the lens carrier.

In the illustrated embodiment of the invention, the lens connectors 156 engage the arcuate sections 166 and 168 of the lens 42 (FIGS. 5, 7 and 8). The lens connectors 156 do not engage the linear side sections 162 and 164 of the lens 42 (FIGS. 6 and 9). However, if desired, lens connectors 156 could be provided to engage the linear side sections 162 and 164 of the rim portion 160 of the lens.

The illustrated lens connectors 156 have a relatively short arcuate extent (see FIGS. 2, 3 and 5) along the arcuate sections 166 and 168 of the rim portion 160. If desired, the extent of the lens connectors along the rim portions 160 could be increased to increase the extent of engagement of the lens connectors with the rim portion of the lens.

Although only the lens connectors 156 for the lens 42 are illustrated in FIGS. 8 and 9, it should be understood that the lens connectors 156 all have the same construction and cooperate with rim portions 160 of the lenses 40, 42 and 44 in the same manner. Although only the lens carrier recess 184 for the lens 42 is illustrated in FIGS. 8 and 9, it should be understood that the lens carrier 66 is provided with a separate recess 184 for each of the lenses 40, 42 and 44. Of course, if a greater or lesser number of lenses was utilized in the sensor assembly a greater or lesser number of recesses 184 would be provided in the lens carrier 66.

Only the lens 42 is illustrated in FIG. 7. It should be understood that the lenses 40, 42 and 44 all have the same construction. The lenses 40, 42 and 44 are molded from a suitable polymeric material. If desired, the lens connectors 156 could be integrally molded as one piece with the lenses 40, 42 and 44. If this was done, the lens connectors would extend axially from the rim portions 160 of the lenses 40, 42 and 44 into engagement with the lens carrier 66.

The lens connectors 156 and lens carrier recesses 184 cooperate with the lenses 40, 42 and 44 to firmly and securely hold the lenses 40, 42 and 44 in the sensor assembly 20. The lens carrier recesses 184 hold the lenses 40, 42 and 44 against rotation about central axes of the lenses and against sidewise movement. The lens connectors 156 continuously press the lenses 40, 42 and 44 into the lens carrier recesses 184 to prevent rattling of the lenses. Therefore, the lens carrier 66 and lens connectors 156 cooperate with the lenses 40, 42 and 44 to ensure that the focal length of the optical system in the sensor assembly 20 is maintained.

Connector Assembly

An electrical connector assembly 200 (FIG. 4) is utilized to connect the sensor assembly 20 with an electrical conductor. In accordance with another feature of the invention, the connector assembly 200 impedes access to the interior of the sensor housing 22. To this end, the electrical connector assembly 200 is free of externally accessible elements, such as wrenching flats, which can be engaged to disconnect the electrical connector assembly from the housing 22. In addition, the connector assembly 200 is relatively simple in construction, easy to install and thereby tends to minimize the cost of the sensor assembly 20.

The connector assembly 200 (FIG. 4) includes a plurality of terminals or prongs 204 which are connected with the circuit board 50 by electrical conductors 208. Although the illustrated electrical conductors 208 are flexible insulated wires, it is contemplated that suitable sheet metal terminals could be utilized in an interconnected between the connector assembly 200 and the circuit board 56 if desired.

The connector assembly 200 includes a generally cylindrical body portion 210 and a flange portion 212. The body portion 210 of the connector assembly 200 is telescopically received in the mounting section 36. A pair of coaxial O-rings 216 and 218 extend around the body portion at axially spaced apart locations along the body portion.

To maintain a desired axial spacing between the O-rings 216 and 218, the O-rings are disposed in axially spaced apart grooves 220 and 222 in the body portion 210 of the connector assembly 200. The O-rings 216 and 218 sealingly engage an inner side surface of the mounting section 36. The O-rings 216 and 218 seal the cylindrical opening in the mounting section 36 so that contaminants can not enter the housing 22.

A cylindrical socket chamber 228 (FIG. 4) is provided on the outer end portion of the connector assembly 200 to telescopically receive a connector secured to an electrical conductor. The connector secured to the electrical conductor (not shown) has suitable sockets which are engaged by the terminals 204 and 206. Of course, the connector assembly 200 could be provided with sockets which are engaged by terminals on the connector which is connected with the electrical conductor if desired.

In accordance with one of the features of the invention, the connector assembly 200 is retained in the sensor housing 22 by engagement of the flange portion 212 with a recess or slot 230 formed in the housing 22. The body portion 210 is rotatably received in a cylindrical opening 232 (FIGS. 4 and 10). The opening 232 extends through the lower end wall 34 and through the mounting section 36.

The longitudinally extending recess 230 (FIG. 10) has a central axis which extends perpendicular to a central axis 236 of the opening 232. The recess 230 is offset to one side, that is, toward the side wall 28, from the opening 232. The recess 230 has an axial extent which is greater than the length of the flange portion 212 (FIG. 11).

When the connector assembly 200 is to be positioned in the housing 22, the cylindrical body portion 210 of the connector assembly is axially aligned with the opening 232 (FIG. 10). At this time, an index corner 240 on the rectangular flange portion 212 (FIG. 10) is aligned with an arcuate positioning surface 242 on the inside of the housing 22. The positioning surface 242 cooperates with the index corner 240 on the flange portion 212 so that the connector assembly 200 can be inserted into the housing in only one orientation.

As the connector assembly 200 is moved into the housing 22, the body portion 210 moves into the opening 232. As the connector assembly 200 continues to move along the central axis 236 of the opening 232, the flange portion 212 moves into abutting engagement with the lower end wall 34 of the housing 22 (FIG. 11). When this occurs, the connector assembly 200 is accurately positioned relative to the housing 22. The O-rings 216 and 218 (FIGS. 4 and 10) on the body portion 210 of the connector assembly are disposed in sealing engagement with the cylindrical inner side surface of the opening 232 extending through the mounting section 36.

Figure 12:
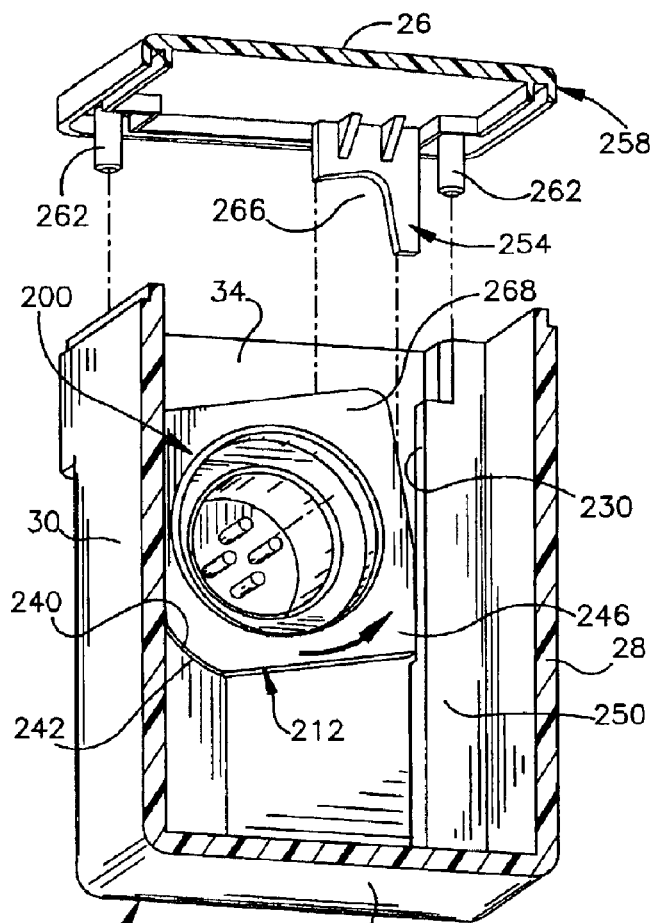
FIG. 12 is a schematic illustration, generally similar to FIGS. 10 and 11, illustrating the relationship of the electrical connector assembly to the bottom wall of the sensor housing after the electrical connector assembly has been rotated to a secured position and prior to closing of a cover of the sensor housing.

The connector assembly 200 is then rotated in a counterclockwise direction (as viewed in FIG. 11) to the position illustrated in FIG. 12. As this occurs, a corner portion 246 of the flange portion 212 moves into the recess or slot 230. Once the corner portion 246 has entered the slot 230, the connector assembly 200 is held against axial movement by the housing 22. Therefore, if an axially upward (as viewed in FIG. 4) force is applied against the connector assembly 200, engagement of the corner portion 246 with the recess or slot 230 (FIG. 12) in the housing 22 blocks axially upward (as viewed in FIG. 4) movement of the connector assembly 200.

In the illustrated embodiment of the invention, the slot or recess 230 (FIG. 12) is formed by an elongated retainer section 250 of the housing 22. The retainer section 250 is integrally formed as one piece with the lower end wall 34 and side wall 28 of the housing 22. If desired, the recess 230 and retainer section 250 could be formed in a different manner and could have a different configuration.

It is contemplated that the recess or slot 230 could be formed in the housing 22 in a manner other than by the provision of the elongated retainer section 250. For example, a relatively small overhanging shelf could be provided adjacent to the lower end wall 34 of the housing 22. Although only a single retainer section 250 is provided in the illustrated embodiment of the invention, it is contemplated that a pair of recesses or slots 230 could be provided in the housing 22 to engage opposite corners on the flange portion 212 of the connector assembly 200.

In order to prevent removal of the connector assembly 200 once the sensor assembly 20 has been assembled, the retainer flange or finger 254 is provided to block clockwise (as viewed in FIGS. 12 and 13) rotational movement of the connector assembly 200. In the illustrated embodiment of the invention, the rear wall 26 of the housing 22 is formed on a cover portion 258. After all of the components of the sensor assembly 20 have been positioned in the housing 22, the cover portion 258 is moved downward (as viewed in FIG. 12) into engagement with the main portion of the housing. The cover portion 258 is then secured in place by a suitable adhesive. Securing of the cover portion 258 in place is facilitated by a plurality of pins 262 which extend from the cover portion and are received in suitable sockets formed in the housing 22 at the corners of the housing.

Figure 13:
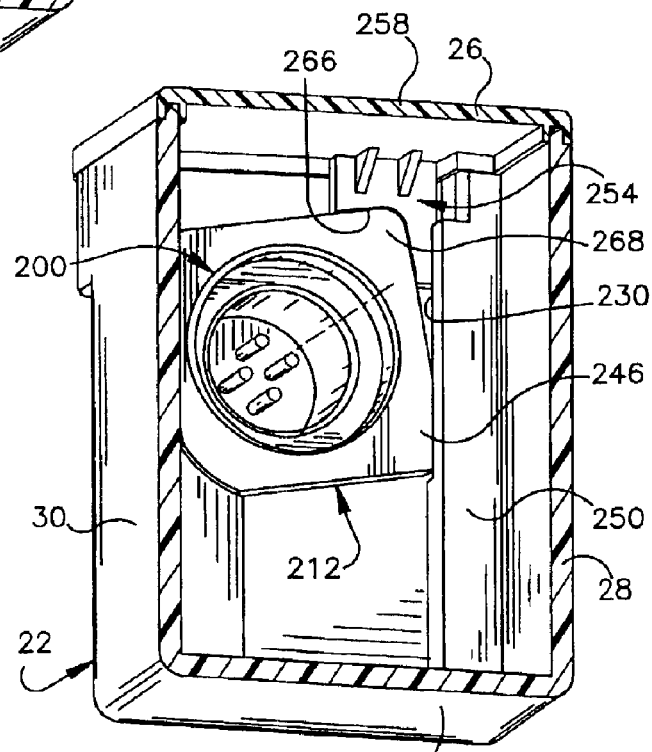
FIG. 13 is a fragmentary schematic illustration, generally similar to FIGS. 11–12, illustrating the closed cover and a retainer which engages the electrical connector assembly to hold the electrical connector assembly in the secured position.

Once the cover portion 258 has been secured in place, as shown in FIG. 13, a generally L-shaped recess 266 (FIG. 12) defined by the retainer flange 254 engages a corner portion 268 of the flange portion 212 (FIG. 13) to hold the connector assembly 20 against clockwise rotation relative to the housing 22. Thus, the flange 254 engages the corner portion 268 and blocks rotational movement of the corner portion 268 into alignment with the retainer section 250. Therefore, the corner portion 246 of the flange portion 212 remains in the recess 230.

In the illustrated embodiment of the invention, the flange portion 212 of the connector assembly (FIG. 10) is integrally formed as one piece with the body portion 210 of the connector assembly. Thus, both the flange portion 212 and body portion 210 of the connector assembly 200 are integrally molded from a suitable polymeric material. It is contemplated that the same polymeric material and pigment which is utilized to form the housing 22 may also be utilized to form the connector assembly 210.

The flange portion 212 may be formed separately from the body portion 210. If this is done, the flange portion 212 may be fixedly connected with the body portion 210. Both the body portion 210 and the flange portion 212 would rotate together between the position shown in FIG. 11 and the position shown in FIG. 12.

Alternatively, the flange portion 212 may be rotatably connected with the body portion 210 of the connector assembly 200. This would enable the flange portion 212 to be rotated relative to the housing 22 while the body portion 212 of the connector assembly 200 remains stationary relative to the housing. If the flange portion 212 is formed separately from the body portion 210 of the connector assembly 200, the flange and body portions could be formed of different materials. For example, the flange portion 212 could be formed of metal while the body portion 210 is formed of a polymeric material.

The illustrated connector assembly 200 has a generally square flange portion 212 (FIG. 10). However, it is contemplated that the flange portion 210 could have a different configuration if desired. For example, the flange portion 212 could have a generally ovoid configuration with a circular portion which is connected with the body portion 210 and an outwardly projecting arm portion. The outwardly projecting arm portion may be received in the recess 230 to hold the connector assembly 200 against axial movement relative to the housing 22. Alternatively, the flange portion 212 could be formed with a pair of outwardly extending arms which would be received in recesses in the housing 22 disposed at opposite sides of the opening 232.

Circuit Board

The circuit board 50 (FIGS. 2 and 4) is mounted on the lens carrier 66. Thus, the circuit board 50 is mounted on a rearwardly facing end portion of the lens carrier 66 opposite from the lenses 40, 42 and 44. The circuit board 50 is fixedly connected to the lens carrier 66 by a plurality of fasteners 280 (FIG. 2).

By mounting the lenses 40, 42 and 44 on the rightwardly (as viewed in FIG. 2) facing end portion of the lens carrier 66 and the circuit board 50 on the leftwardly facing (as viewed in FIG. 2) end portion of the lens carrier 66 prior to insertion of the lens carrier into the housing 22, fabrication of the sensor assembly 20 is facilitated. Thus, the lens carrier 66, tubes 122, 124 and 126 (FIG. 2), lenses 40, 42, and 44, and circuit board 50 are all interconnected while the lens carrier 56 is spaced from the housing 22. These components are then inserted into the housing 22 as a unitary module.

Although it is preferred to mount the circuit board 50 on the lens carrier 66 in the manner illustrated in FIG. 4, it is contemplated that the circuit board 50 could be mounted in the housing separately from the lens carrier if desired. For example, the circuit board 50 could be connected with the cover portion 258 of the housing 22. Alternatively, the circuit board 50 could be connected with suitable mounting lugs mounted on the side walls 28 and 30 and/or end walls 32 and 34 of the housing 22.

In accordance with one of the features of the present invention, the position of the light source 48, upper light detector 54 and lower light detector 56 (FIGS. 2 and 4) can be adjusted relative to each other. By adjusting the positions of the light source 48, upper light detector 54 and lower light detector 56 relative to each other, the location of an object from which infrared red light from the light source 48 is reflected back to the light detectors 54 and 56 can be adjusted. This enables the effective operating range of the sensor assembly 20 to be adjusted.

In the illustrated embodiment of the invention, the light detectors 54 and 56 are movably mounted on the circuit board 50 to enable their positions to be adjusted relative to the light source 48. However, it is contemplated that the light source 48 could also be movably mounted on the circuit board 50 to enable the position of the light source to also be adjusted.

Figure 14:
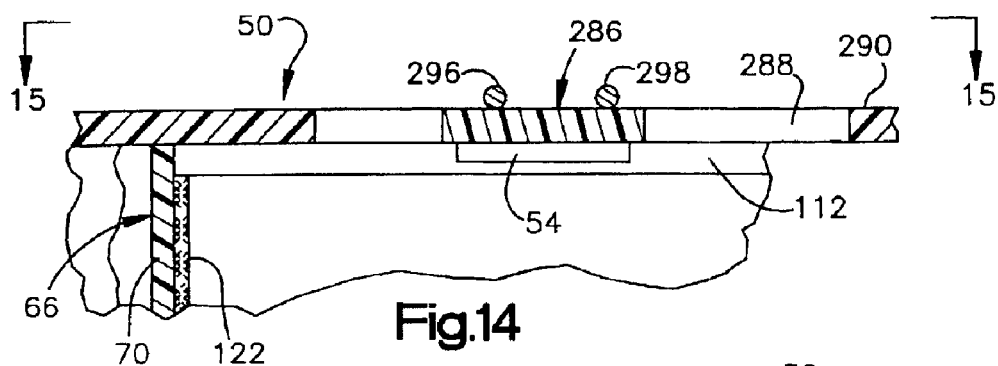
FIG. 14 is a fragmentary schematic illustration depicting the manner in which a detector is mounted on a daughter board or carriage for movement relative to a mother or main circuit board in the sensor assembly of FIG. 1.

To facilitate positioning of the light source 54 relative to the circuit board 50, the upper lens 40 and the light source 48, the upper light detector 54 is mounted on a daughter board or carriage 286 (FIGS. 4 and 14). The daughter board or carrier 286 is received in a slot 288 formed in a main or mother board 290. The daughter board 286 and mother board 290 are part of the circuit board 50.

Figure 15:
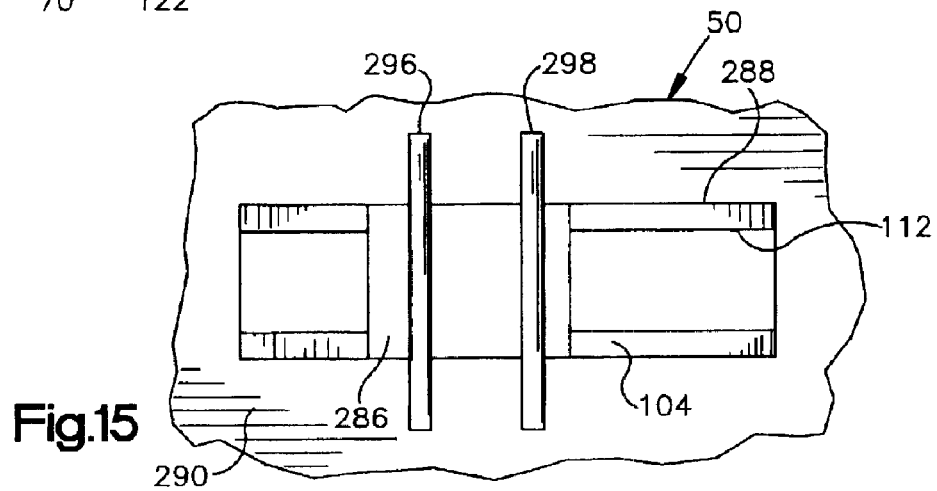
FIG. 15 is a top plan view, taken generally along the line 15—15 of FIG. 14, illustrating the manner in which the carriage is retained in a desired position.

The slot 288 (FIGS. 2 and 4) in the main or mother board 290 is aligned with the slot 112 (FIGS. 2 and 3) formed in the rear end wall 104 of the tubular section 70 of the lens carrier 66. The slot 288 in the mother or main board 290 is slightly wider than the slot 112 in the rear end wall 104 of the tubular section 70 of the lens carrier (FIGS. 2, 14 and 15). This enables the carriage or daughter board 286 to be supported by the end wall 104 of the lens carrier 66 as the carriage or daughter board is moved along the slot 288 in the main or mother board 290 (FIG. 15).

Thus, once the circuit board 50 has been fixedly connected with the lens carrier 66, the carriage 286 on which the light detector 254 is mounted is moved along the slot 288 in the mother board 290. During this movement, the carriage 286 engages the rear end wall 104 (FIGS. 3 and 15) of the tubular section 70 of the lens carrier 66 to support the carriage. At this time, the light detector 54 is aligned with and disposed in the slot 112 in the rear end wall 104 of the tubular section 70 (FIG. 14).

Once it has been determined that the light detector 54 has a desired position relative to the mother or main board 290, the carriage 286 is fixedly connected to the mother or main board. This may be accomplished by soldering a pair of wires 296 and 298 (FIG. 15), which extend across the carriage 286, to both the carriage and the mother or main board 290.

By having the position of the light detector 54 adjustable relative to the light source 48, the light detector is effective to detect light reflected from an object at a predetermined distance from the sensor assembly 20. Thus, the closer the light detector 54 is to the light sensor 48, the greater is the distance at which light will be reflected from an object to the upper light detector 54. Similarly, the further the upper light detector 54 is from the light source 48, the smaller is the distance at which light from the light source 48 will be reflected from an object to the upper light detector 54. Since the effective operating range of the sensor assembly 20 is determined by the distance at which light from the light source 48 is reflected from an object back to the light detectors 54 and 56, accurate positioning of the light detectors 54 and 56 relative to the light source 48 is important.

Although only the upper light source 54 is illustrated in FIGS. 14 and 15, it should be understood that the lower light source 56 (FIG. 4) is mounted on a carriage or daughter board 304 having the same construction as the carriage 286.

The carriage 304 is movable along a slot 306 in the mother or main board 290 to position the light detector 56 relative to the light source 48. The light detector 56 detects light which is reflected from an object and transmitted through the lens 44 to the light detector. The light detector 56 is aligned with the slot 114 (FIG. 3) in the rear end wall 108 of the tubular section 74 of the lens carrier 66. Suitable fasteners, corresponding to the wires 296 and 298, are provided to secure the carriage or daughter board 304 to the main or mother board 290. In the embodiment of the invention illustrated in FIGS. 14 and 15, the carriage 286 is moved along the slot 288 in the mother or main board 290 to a desired position. The wires 296 and 298 are then fixedly connected with the carriage or daughter board 286 and the main or mother board 290 to hold the carriage in the desired position.

Figure 16:
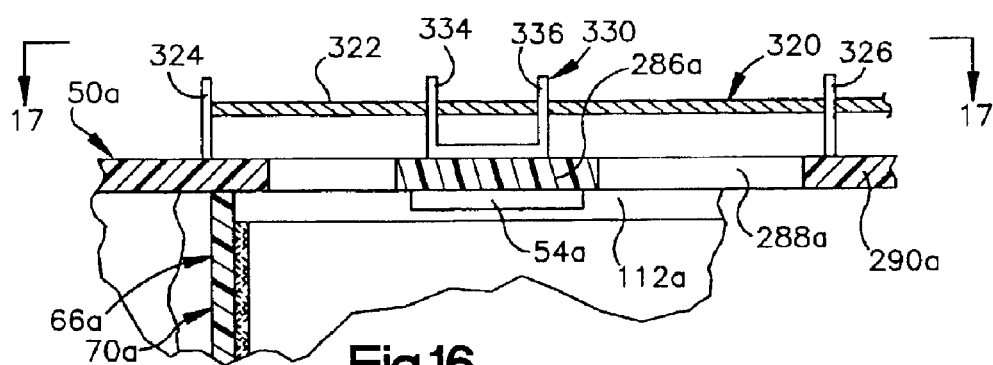
FIG. 16 is a fragmentary schematic illustration, generally similar to FIG. 14, illustrating the relationship of a second embodiment of the movable daughter board or carriage relative to the mother or main circuit board in the sensor assembly of FIG. 1.
Figure 17:
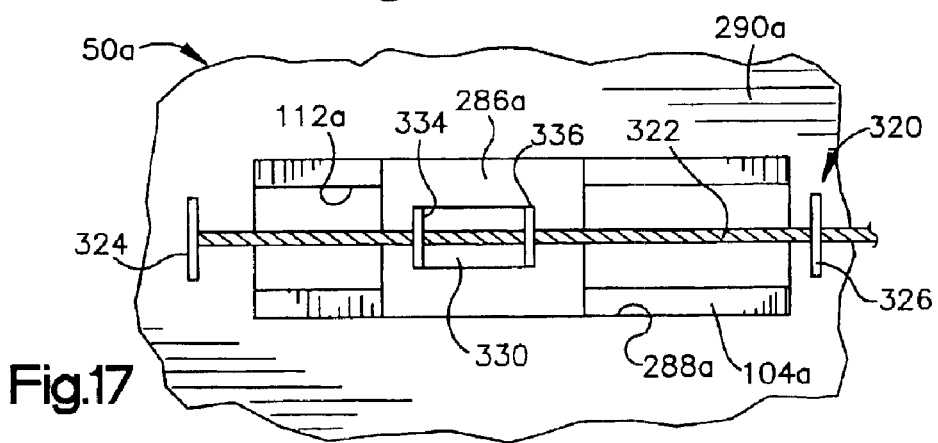
FIG. 17 is a plan view, taken generally along the line 17—17 of FIG. 16, further illustrating the relationship of the movable daughter board to the mother board.

In the embodiment of the invention illustrated in FIGS. 16 and 17, a drive mechanism is connected with the carriage to enable the position of the light detector to be adjusted. Since the embodiment of the invention illustrated in FIGS. 16 and 17 is generally similar to the embodiment of the invention illustrated in FIGS. 14 and 15, similar numerals will be utilized to designate similar components, the suffix letter "a" being added to the numerals of FIGS. 16 and 17 to avoid confusion.

A light detector 54a (FIG. 16) is mounted on a carriage or daughter board 286a. The carriage or daughter board 286a is movable relative to a mother or main board 290a by a drive mechanism 320. The drive mechanism 320 includes a screw 322 which is rotatably supported by a pair of support elements 324 and 326. The support elements 324 and 326 are fixedly connected to the mother or main board 290a and hold the screw 322 against axial movement relative to the mother or main board 290a.

A generally U-shaped bracket 330 is fixedly connected to the carriage or daughter board 286a. The bracket 330 has upstanding (as viewed in FIG. 16) sections 334 and 336 which are engaged by an external thread on the screw 322. Therefore, upon rotation of the screw 322, the bracket 330 and carriage 286a are moved along a slot 288a formed in the mother or main board 290a.

The longitudinally extending slot 288a in the mother or main board 290a is aligned with a longitudinally extending slot 112a in an end wall 104a of the tubular section 70a of the lens carrier 66a. The slot 288a in the main or mother board 290a is wider than the slot 112a in the end wall 104a of the lens carrier 66a (FIG. 17). Therefore, the end wall 104a of the lens carrier 66a is effective to support the carriage or daughter board 286a as it is moved along the slot 288a in the main or mother board 290a by operation of the drive mechanism 320. Although only the drive mechanism 320 for moving the carriage 286a has been illustrated in FIGS. 16 and 17, it should be understood that a similar drive mechanism is provided to move a light detector corresponding to the light detector 56 of FIG. 4, relative to the circuit board 50a and a light source corresponding to the light source 48 of FIG. 4.

In the embodiment of the invention illustrated in FIGS. 14 and 15, the carriage 286 and detector 54 are moved to a desired position relative to the light source 48 and then fixedly secured in that position by the wires 296 and 298. In the embodiment of the invention illustrated in FIGS. 16 and 17, the carriage 286a and light source 54a are moved to a desired position relative to a light source corresponding to the light source 48 of FIG. 4, by operating the drive mechanism 320. It is contemplated that the drive mechanism 320 could be locked so that once the position of the carriage 286a and light source 54a has been adjusted, their positions can not be readily changed. Alternatively, the drive mechanism 320 may be accessible from outside of the sensor assembly so that a user could adjust the position of the carriage 286a and light source 54a.

Black Coating

Portions of the circuit board 50 are exposed to the interior of the tubular sections 70, 72 and 74 (FIGS. 2 and 4) of the lens carrier 66. In addition, wiring extends through openings between opposite sides of the circuit board 50. These openings, which may be referred to as vias, and the surface area of the circuit board 50 may result in an increase in the magnitude of background light within the sensor assembly 20. This background light may tend to impair the operating characteristics of the sensor assembly.

In order to minimize unwanted background light, a black coating 344 (FIG. 18) is applied to a side 346 of the circuit board 50 which faces towards the lenses 40, 42 and 44. The black coating 344 extends across openings or vias 348 which extend between the front side 346 of the circuit board 50 and a rear side 352 of the circuit board 50. A circuit component, such as a wire 354, extends through the opening 348. It should be understood that the wire 354 should be considered as merely being representative of many different circuit components and/or mountings for circuit components, which may extend through openings in the circuit board 50.

The black coating 344 extends across the front end portion of the opening 348 to block transmittal of light through the opening. In addition, the black coating 344 blocks light from passing through laminations which form the circuit board 50. The black coating 344 also reduces stray light reflections within the sensor assembly 20.

The black coating 344 advantageously has an irregular surface which faces towards the lenses 40–44 in order to enhance the light absorbing characteristics of the black coating. The black coating may be formed by a non-reflective layer of black paint which may be referred to as flat black paint. Alternatively, the coating 344 could be formed with a velvety surface similar to the surface of flock paper.

In one specific instance, the light absorbing black coating 344 was an epoxy paint. However, it is contemplated that the black coating 344 could be formed of other materials if desired. For example, the black coating 344 could be formed by a black layer which is secured to the circuit board 50 by a suitable adhesive.

Figure 18:
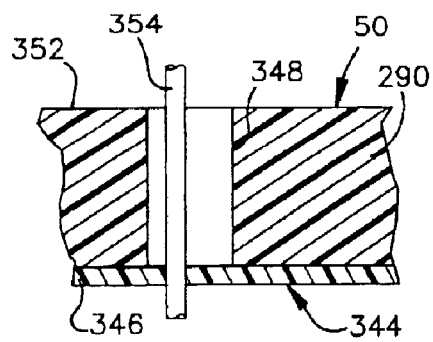
FIG. 18 (on sheet 7 of the drawings) is an enlarged fragmentary schematic illustration depicting the manner in which a black coating overlies one side of the circuit board.

The black coating 344 has been illustrated in FIG. 18 as being applied to the main or mother board 290. It is also contemplated that the black coating 344 will extend across the sides of the carriages 286 and 304 (FIG. 4) which face toward the lenses 40, 42 and 44. It is believed that it may be advantageous to extend the flat black coating to the side surfaces of the slots 288 and 306 along which the carriages 286 and 304 are movable. Thus, the black coating 344 would cover not only the side of the mother board or main section 290 which faces toward the lenses 40–44 but could also cover the sides of the carriages or daughter boards 286 and 304 which face toward the lenses and the sides of the slots 288 and 306 and/or the sides of the carriages 286 and 304 which extend between the front side 346 and rear side 352 of the circuit board 50.

Conclusion

The present invention relates to a new and improved sensor assembly 20. The sensor assembly 20 includes a light source 48 and a lens 42 which directs light from the light source to a remote object. Light reflected from the remote object is transmitted through another lens 40 to a light detector 54.

The lenses 40 and 42 may advantageously be mounted on a lens carrier 66. The lens carrier 66 is disposed in a housing 22. The lenses 40 and 42 are advantageously connected with the lens carrier 66 by a plurality of releasable connectors 156. The connectors 156 may be disposed in engagement with the rim portions 160 of the lenses 40 and 42 and press the lenses into recesses 184 formed in the lens carrier 66. The connectors 156 may be of the snap-in type.

The sensor assembly 20 may advantageously include a connector assembly 200 which connects the sensor assembly with an electrical conductor. This tamper resistant electrical connector assembly 200 may include a body portion 210 and a flange portion 212. The flange portion 212 may be movable to engage a recess 230 in the sensor housing 22 and retain the electrical connector assembly 200 against movement along a central axis of body portion of the connector assembly. In order to resist unauthorized access to the interior of the sensor assembly, a retainer 254 may engage the flange portion 212 of the electrical connector assembly and hold the flange portion 212 against movement out of engagement with the recess.

The light source 48 and/or the light detector 54 may be movable relative to a circuit board 50 to adjust the distance at which light from the light source is reflected from an object back to the detector. The circuit board 50 may be connected with the lens carrier 66. A black coating 344 may advantageously be provided on a side of the circuit board 50 facing toward the lenses.

The sensor assembly 20 may include one or more of a plurality of features of the present invention. It should be understood that although the features may advantageously be used in combination with each other, the features may also be used separately. For example, the lens connectors 156 may be used in combination with or separately from the electrical connector assembly 200. Similarly, the lens carrier 66 may be used separately or in combination with the lens connectors 156 and/or electrical connector assembly 200.

What is claimed is:

1. A sensor assembly comprising a sensor housing, a circuit board disposed in said sensor housing, a light source disposed within said sensor housing, a light detector disposed within said sensor housing, a first lens at least partially disposed in said sensor housing and through which light from said light source is transmitted to a location outside of said sensor housing, a second lens at least partially disposed in said sensor housing and through which light transmitted from said light source and reflected from the location outside of the housing is transmitted to said light detector, a first one of said light source and light detector being connected with said circuit board, a carriage which is disposed in said sensor housing and is movable relative to said circuit board, a second one of said light source and light detector being connected with said carriage for movement with said carriage relative to said circuit board, a retainer which is connected with said carriage and said circuit board to retain said carriage in a position to which said carriage is moved relative to said circuit board, and a connector assembly which is connected with said circuit board and is adapted to be connected with an electrical conductor, said connector assembly being movable relative to said sensor housing between a secured position in which said connector assembly engages a portion of said sensor housing to retain said connector assembly against movement relative to said sensor housing along a central axis of said connector assembly and a release position in which said connector assembly is movable relative to said sensor housing along the central axis of said connector assembly.

2. A sensor assembly as set forth in claim 1 wherein said connector assembly includes a body portion which is disposed in an opening in said sensor housing when said connector assembly is in the secured position and a flange portion being rotatable relative to said sensor housing about the central axis of said body portion during movement of said connector assembly between the secured and release positions.

3. A sensor assembly as set forth in claim 2 wherein said body portion and said flange portion of said connector assembly are integrally formed as one piece and are fixedly interconnected.

* * * * *